July 14, 1925.
D. R. SCHOLES
WINDMILL
Filed July 8, 1922
1,545,609
2 Sheets-Sheet 2
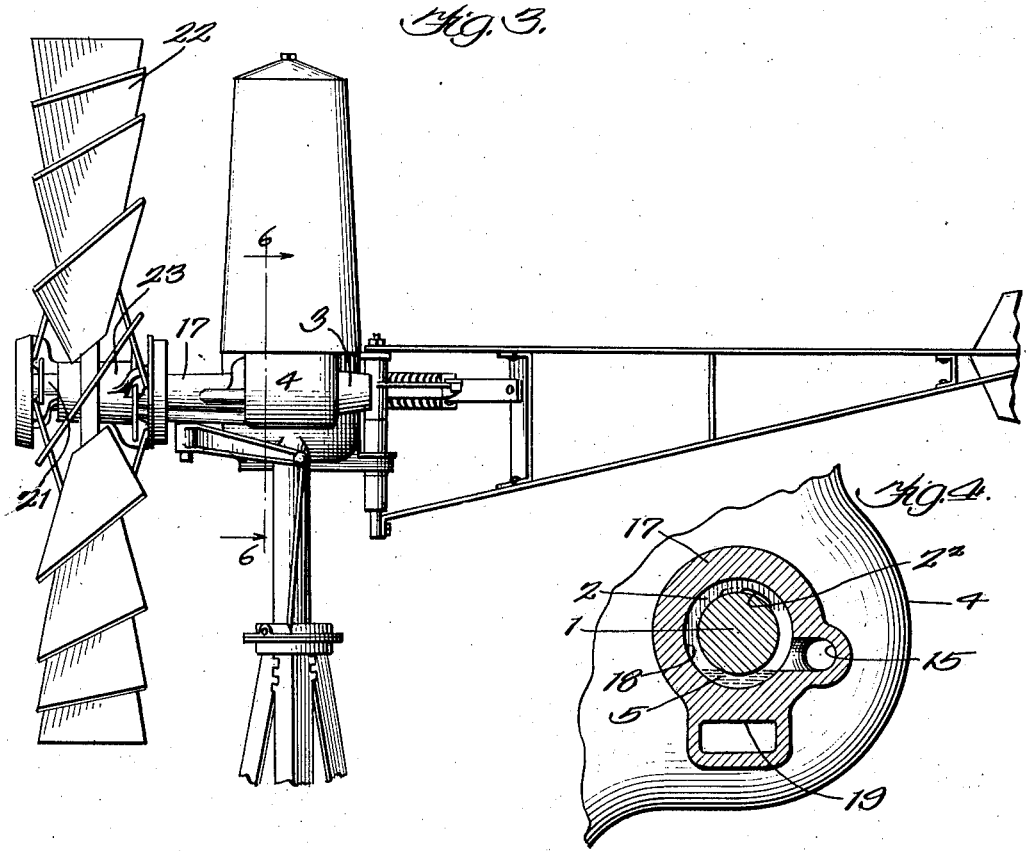
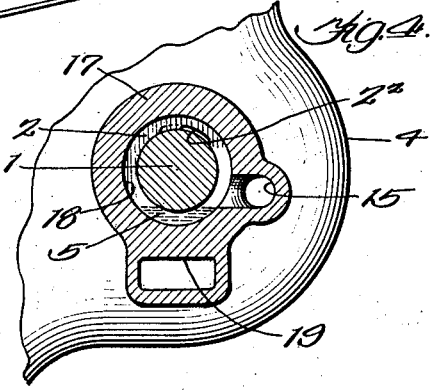
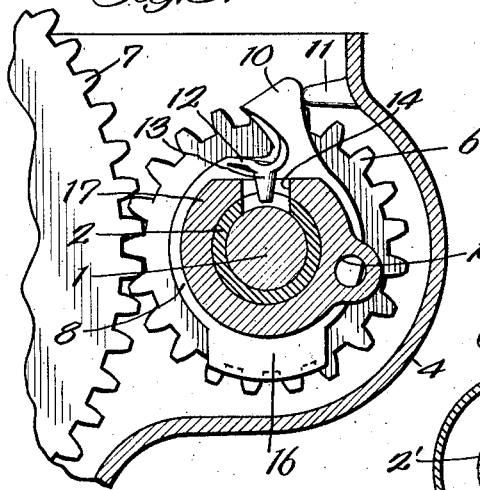
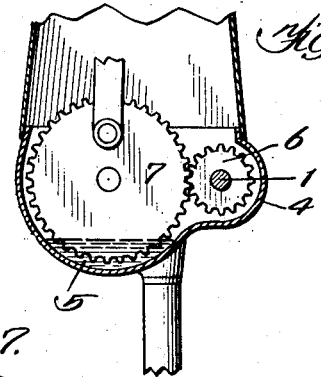
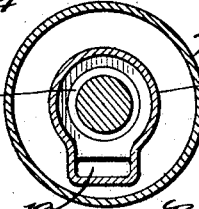
Inventor:
Daniel R. Scholes Patented July 14, 1925.

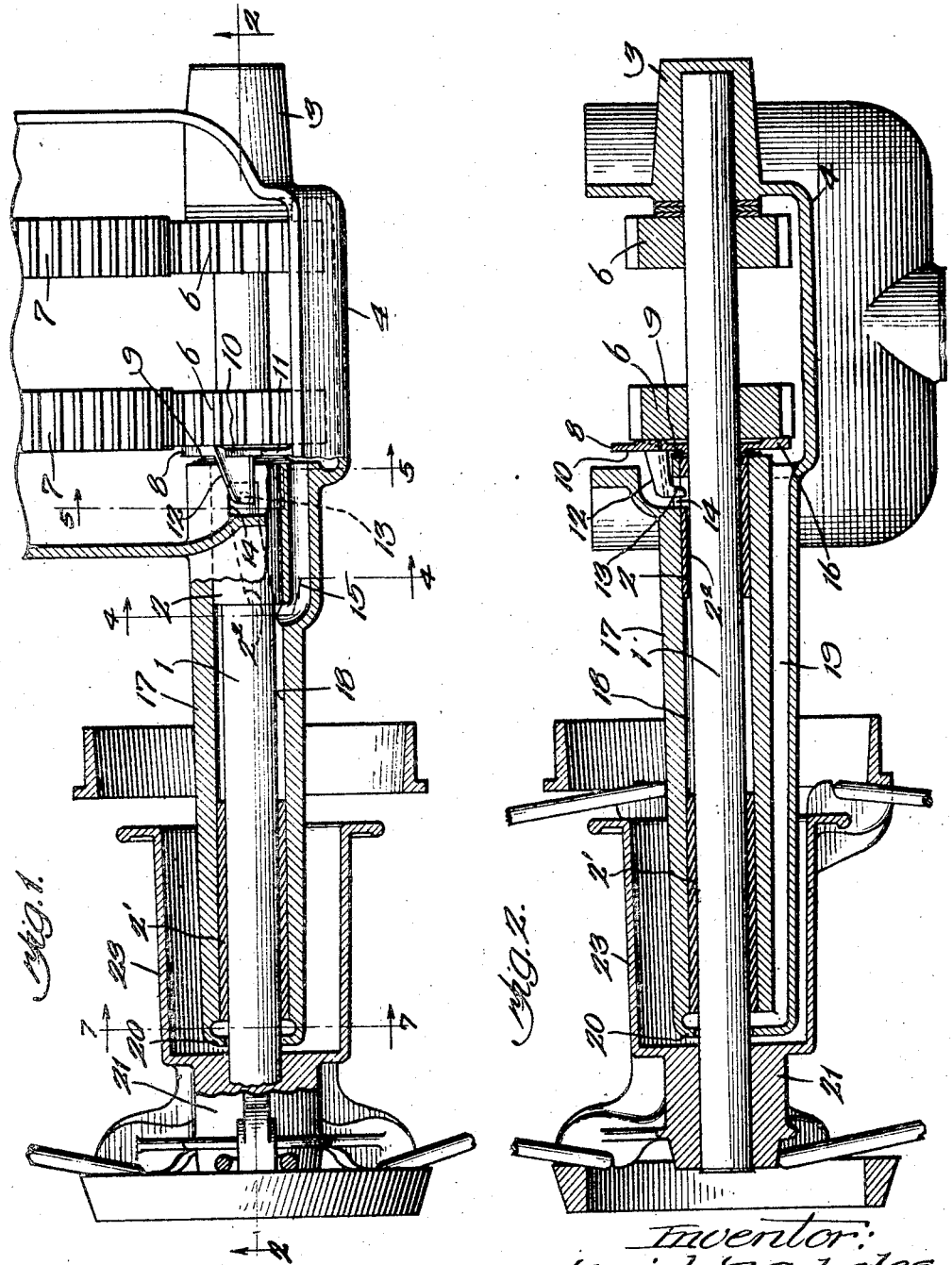

1,545,609

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

WINDMILL.

Application filed July 8, 1922. Serial No. 573,591.

*To all whom it may concern:*

Be it known that I, DANIEL R. SCHOLES, citizen of the United States, residing at Chicago, in the county of Cook and State of Illinois, have invented a certain new and useful Improvement in Windmills, of which the following is a full, clear, concise, and exact description.

My invention relates to windwills and has for its object the provision of improved means for lubricating the wind wheel shafts.

The windmill of the invention includes lubricating mechanism having a basin containing lubricant and formed with a sleeve extension having an open outer end, a shaft journaled in said extension, motion transmitting mechanism including a gear wheel upon the shaft and within the basin and dipping into the lubricant contained in the basin, and means for transferring lubricant elevated by the gear wheel to the shaft within the sleeve, there being a return passage beneath the sleeve extension and connecting the outer end thereof with the basin. The basin is mounted to turn upon an upright axis and the sleeve extension of the basin is horizontal. The wind wheel has a hub portion surrounding the sleeve extension and closed ended to guard the open end thereof against the weather.

The invention will be more fully explained by reference to the accompanying drawings in which Fig. 1 is a sectional plan view illustrating portions of the windmill structure as such is preferably made; Fig. 2 is a sectional view on line 2—2 of Fig. 1; Fig. 3 is a side view of the upper portion of the windmill containing the mechanism of the invention; Fig. 4 is a sectional view on line 4—4 of Fig. 1; Fig. 5 is a sectional view on line 5—5 of Fig. 1; Fig. 6 is a sectional view on line 6—6 of Fig. 3; and Fig. 7 is a sectional view on line 7—7 of Fig. 1.

Like parts are indicated by similar characters of reference throughout the different figures.

The wind wheel shaft 1 is provided with bearings 2, 2' and 3 carried by a gear housing 4 which is made imperforate, particularly at its lower portion, so as to contain lubricating oil illustrated at 5 in its lower portion. The shaft 1 carries pinions or small spur gear wheels 6 which are in driving mesh engagement with larger gear wheels 7 that are operatively connected with a suitable load operating pitman which does not need to be illustrated. A washer 8 is pressed against the left face of the left pinion 6 by a conical coil spring 9 which tends to distend axially of the shaft 1 to effect the application of its pressure against the washer 8, the base of the spring 9 resting against the housing 4 at the right end of the bearing 2. The washer 8 is circular at its right and left hand sides but is enlarged at its upper portion 10 beyond the periphery of the adjacent pinion 6 so as to engage a lug 11 carried by the housing whereby the washer is withheld from rotation. The washer is cut away beneath the overhanging extension 10 and within the circle of its side portions so as there to constitute an entrance to an oil conducting trough 12 which terminates at its outer end in a leader 13 provided for directing the oil into an opening 14 in the bearing 2. The oil conveyed through the trough 12 is directed to the opening 14 by the leader 13 and finds its way directly to the shaft 1 at the opening 14 and works endwise of the shaft in both directions, some of the oil that works beyond the bearing 2 to the left ultimately finding a return to the housing interior through the return passage 15. A spiral groove $2^a$ promotes the passage of the lubricant through the bearing 2. It is desirable to limit a portion of the left hand pinion 6 to engagement with the right hand border of the trough 12 as much as possible, on which account the washer 8 has a downwardly extending projection 16 which bears against the associate pinion 6 outside of the circle of the sides of the washer.

The basin is mounted to turn upon an upright axis in any usual or suitable way and is formed with a horizontal sleeve extension 17 in which the wind wheel shaft 1 is journaled and through which the shaft extends at both ends. The bearings 2 and 2' are spaced apart between the ends of the sleeve extension to form an annular lubricant receiving passage 18 from which a portion of the lubricant returns to the basin through the passage 15, the balance of the lubricant working its way to the left through the bore of the bearing 2' and thence through the outer open end of this bearing and sleeve extension to find its way back to the basin through the passage 19 which underlies the sleeve extension proper, this passage being preferably formed in an enlargement of the sleeve extension and communicating with the outer open end thereof.

To guard the outer open end of the sleeve extension from the weather, such sleeve extension is desirably extended to the left to form an overhanging annular apron 20. The shaft 1 projects at its left hand end through and beyond the sleeve extension, and is there assembled with the hub 21 of the wind wheel 22. Further to guard the open end of the sleeve extension from the weather to prevent water from finding its way to the lubricant containing basin, the hub 21 is formed with a portion 23 which surrounds the outer end of the sleeve extension and projects inwardly beyond the same toward the basin. When the wind wheel is in the wind, driving rain is prevented from being wind driven into the sleeve extension and the lubricant returning passages communicating therewith. If the wind wheel is out of the wind the sides of the hub extension 23 will similarly guard the lubricant. The oil ducts that communicate with the bore of the sleeve extension are preferably so disposed and the lubricant level in the basin is desirably such that the lubricant will not rise above the axis of the wind wheel shaft.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

In a windmill, the combination with a basin mounted to turn upon an upright axis formed with a horizontal sleeve extension; of a shaft in said extension, there being space between said shaft and extension and between the ends of the extension for receiving lubricant; power transmitting mechanism including a gear wheel upon the shaft and within the basin and dipping into the lubricant contained in the basin; means for transmitting lubricant elevated by the gear wheel to the inner end portion of the aforesaid sleeve extension, there being a return passage beneath the sleeve extension; and a wind wheel upon the outer end of the shaft which projects beyond said sleeve extension, this wind wheel having a hub portion surrounding the sleeve extension and closed ended to guard the outer end of the extension against the weather, said sleeve extension terminating short of the closed end of said hub portion.

In witness whereof, I hereunto subscribe my name this 6th day of July, A. D. 1922.

DANIEL R. SCHOLES.